Aug. 21, 1934.    G. B. DEVIN    1,970,598
CAMERA WITH MOVING REFLECTORS
Filed March 19, 1932    2 Sheets-Sheet 1

INVENTOR.
GERALD B. DEVIN
BY Robert M. McManigal
HIS ATTORNEY

Aug. 21, 1934.　　　　G. B. DEVIN　　　　1,970,598
CAMERA WITH MOVING REFLECTORS
Filed March 19, 1932　　2 Sheets-Sheet 2
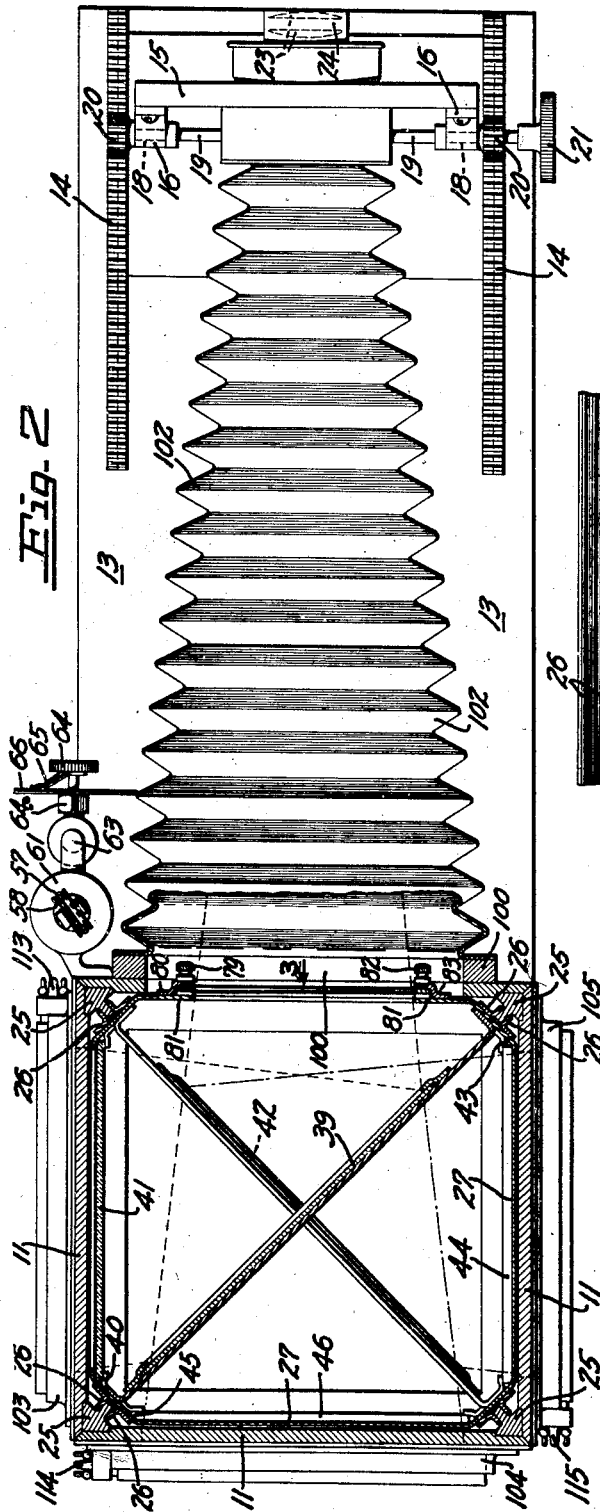
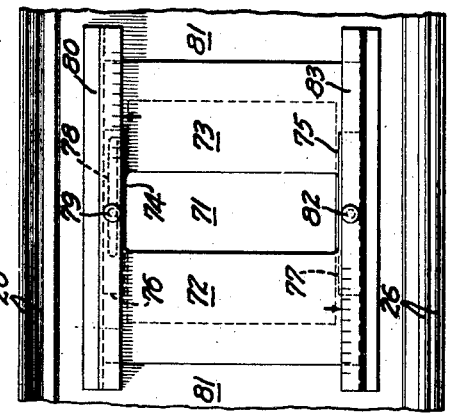
INVENTOR.
GERALD B. DEVIN
BY Robert M. McManigal
HIS ATTORNEY.

Patented Aug. 21, 1934

1,970,598

UNITED STATES PATENT OFFICE 1,970,598

CAMERA WITH MOVING REFLECTORS

Gerald B. Devin, San Francisco, Calif., assignor of fifty-one per cent to Irving V. Moulin, San Francisco, Calif.

Application March 19, 1932, Serial No. 600,030

18 Claims. (Cl. 95—2)

My invention relates to improvements in cameras by which successive exposures may be made expeditiously and quickly, and is particularly adapted to be used in the production of color separation negatives.

It is an object of my invention to provide a camera equipped with moving reflectors and with light apertures to control the passage of light from the lens to the moving reflectors.

Another object of my invention is to produce a camera which is adapted to produce successive exposures in a minimum of time.

Another object of my invention is to produce a camera which operates practically noiselessly.

Another object of my invention is to provide a camera which produces optically perfect images in a small fraction of a second.

Another object of my invention it to produce a camera which operates automatically.

Other and further objects of my invention will be evident from the following description of my invention.

Figure 2 is a view taken on the line 2—2 of Figure 1.

Figure 3 is an enlarged view of the light apertures of my camera. The direction in which the view is taken is indicated by the arrow 3 of Figure 2.

Figures 1, 4, 5:
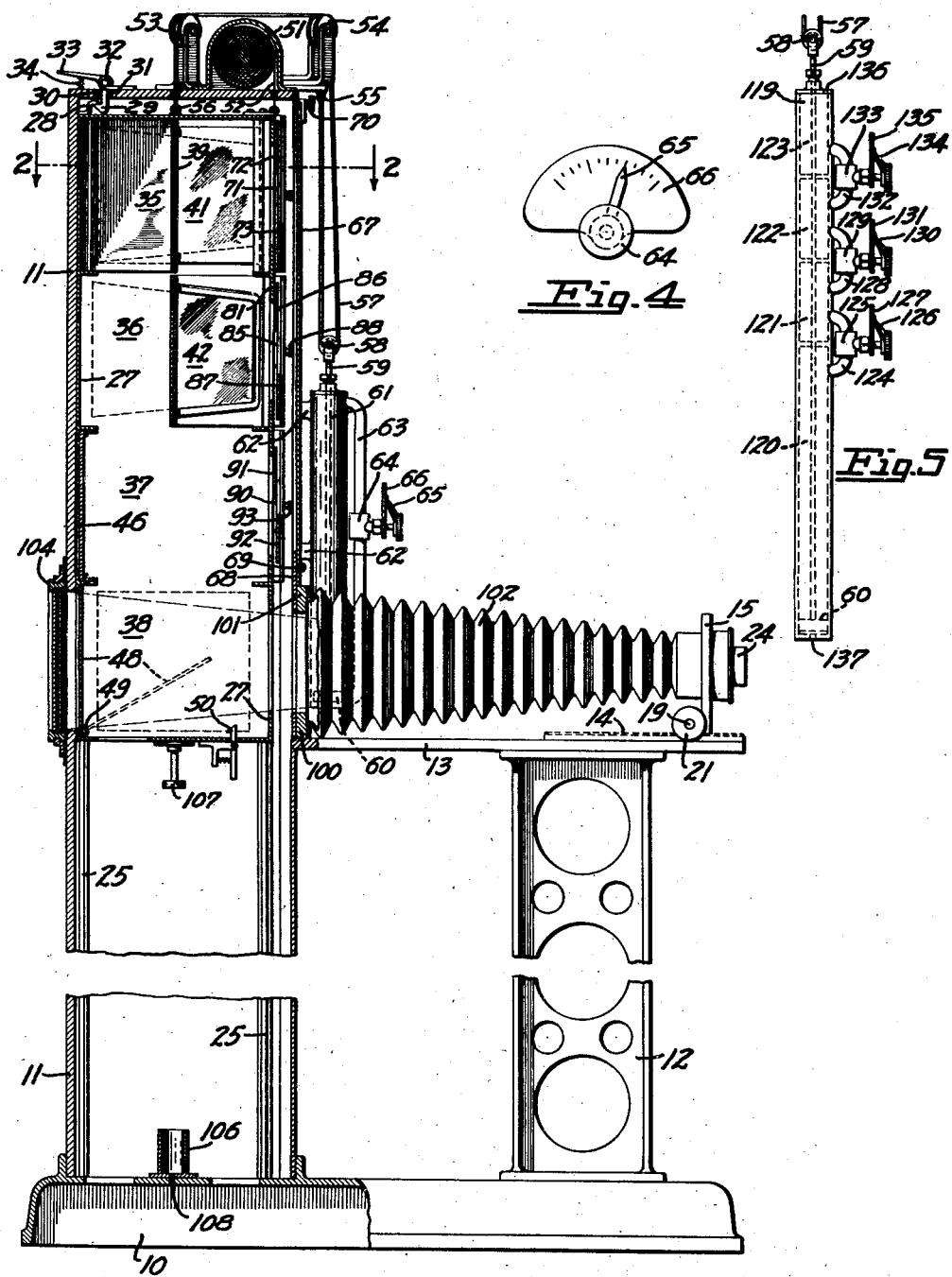
Figure 1 is an elevational view partially sectioned, of the camera of my invention.
Figure 4 is an enlarged view of the indicators and the dials used in my camera.
Figure 5 is a modification of the liquid cylinder of my camera, by means of which the time of exposure of each of the several plates may be varied.

In the drawings the numeral 10 designates a support upon which is mounted a light-tight housing 11 and a support 12. Mounted upon the support 12 and connected to the housing 11 is a support 13. Mounted upon the support 13 are racks 14. A housing 15 is mounted upon the racks 14. The housing 15 is provided with supports 16. The supports 16 are provided with openings 18 through which a bar 19 extends. The bar 19 is provided with gears 20 which are adapted to engage the racks 14. The bar bar 19 is also provided with a thumb-screw 21, by means of which the housing 15 may be moved longitudinally upon the racks 14. The housing 15 is provided with a lens 23 in lens holder 24. The housing 11 may be conveniently made of thin sheet aluminum and is provided with rails 25. The rails 25 extend the entire length of the housing 11 and are adapted to be engaged by guide bars 26 of a moveable carriage 27.

The upper part of the moveable carriage 27 is provided with a catch 28 which is adapted to be engaged by a pawl 29 when the carriage is in the uppermost position. The pawl 29 extends through an opening 30 in the top of housing 11, and is lined with sponge rubber 31 as it passes through said opening, in order to insure a light-tight connection.

The pawl 29 is non-rotatably mounted upon a shaft 32. The shaft 32 is mounted upon the top of housing 11. A rod 33 is also non-rotatably mounted upon the shaft 32. The rod 33 is connected to the housing 11 by means of a spring 34. As the rod 33 is depressed, the shaft 32 is rotated to the left, which frees the pawl 29 from engagement with the catch 28, and allows the moveable carriage 27 to fall.

The moveable carriage 27 is conveniently made in four sections, 35, 36, 37 and 38.

The rear and the two sides of carriage 27 are provided with thin aluminum shields. The aluminum shield is removed from the right hand side of section 35, from the left hand side of section 36 and from the rear of sections 37 and 38.

A reflector 39 is mounted at an angle of forty-five degrees in section 35. The reflector 39 is mounted so that light coming to it from the lens 23 is reflected ninety degrees to the right. Section 35 is also provided with color filter receiving opening 40. A "C" filter 41 is placed in the color filter receiving opening 40.

A reflector 42 is mounted at an angle of forty-five degrees in section 36 so that light coming to it from the lens 23 is reflected ninety degrees to the left. Section 36 is also provided with color filter receiving opening 43. An "A" filter 44 is placed in the color filter receiving opening 43.

Section 37 is provided with color filter receiving opening 45. A "B" filter 46 is placed in the color filter receiving opening 45.

At the rear of section 38 is a door 48 which is held by a spring hinge 49 at its bottom. The spring hinge 49 is adapted to hold the door 48 in its vertical position unless other forces are exerted on said door, and is adapted to force the door back into its vertical position when said other forces are released.

A catch 50 is provided on the bottom of section 38 which is adapted to engage the door 48 when said door is rotated on the hinge 49 to a horizontal position.

Mounted on the top of housing 11 are a roller shaft 51, idle pulleys 53 and 54, and a ring 55. A curtain 52 is wound upon the roller shaft 51, according to well known methods of window shade construction. One end of the curtain 52 is secured to the top of the carriage 27 so that a light-tight connection is made. The top of moveable carriage 27 is provided with a ring 56. A piece of non-expanding belting 57 is connected to the ring 56, guided over pulleys 53 and 54, guided under pulley 58, after which it is secured to the ring 55. A piston rod 59 is secured to the pulley 58 and is connected to piston 60 in a cylinder 61. The cylinder 61 is connected to the housing 11 by means of bars 62. The cylinder 61 is provided with a by-pass 63. The by-pass 63 is provided with a valve 64, which valve is provided with an indicator 65 and a dial 66 so that the position of the valve 64 can be readily ascertained.

The upper front part of housing 11 is made in two parts 67 and 68, which are connected together by a hinge 69. The upper part 67 is secured to the top of housing 11 by means of a locking nut 70.

The portions of section 35, 36 and 37 adjacent to the part 67 of housing 11 are provided with light apertures 71, 85, and 90, respectively.

The light aperture 71 consists of two members 72 and 73. Member 72 is provided with arms 74 and 75, and member 73 is provided with arms 76 and 77. The arm 74 is provided with a slot 78. A set-screw 79 is provided which passes through an opening in side guide 80, slot 78, and is adapted to hold arm 76 of member 73 rigidly against member 81 of moveable carriage 27. A set-screw 82 is provided which passes through an opening in side guide 83, and is adapted to hold the arm 75 of member 72 rigidly against the arm 77 and member 81 of the moveable carriage 27.

The side guides 80 and 83 are provided with indicia and the members 72 and 73 are provided with indicators, so that the opening of the aperture 71 can be readily ascertained.

The light aperture 85 of section 36 is similar to the light aperture 71 of section 35, and consists of members 86 and 87, and set-screws 88.

The light aperture 90 of section 37 is also similar to the light aperture 71 of section 35 and consists of members 91 and 92 and set-screws 93. Members 86, 87, 91 and 92 are also provided with indicia and indicators, so that the apertures 85 and 90 can readily be set at predetermined openings.

When the pawl 29 engages the catch 28 of moveable carriage 27, the bottom of the carriage 27 will be just above the bottom of the support 13. Mounted on the support 13 and connected to the housing 11 is a bar 100, and mounted to the housing 11 just below the hinge 69 is another bar 101. Bellows 102 are connected to the bars 100 and 101. The other end of the bellows 102 is connected to the housing 15.

The center portion of the back of housing 11 to the rear of the bellows 102, and the center portion of the sides of said housing 11 to the rear of said bellows 102, are cut away and in back of said cut-away portions are provided rotatable standard photographic plate holder receiving openings 103, 104 and 105. Rotatable standard photographic plate holder receiving openings are provided so that either vertical or horizontal photographs may be produced.

A small cylinder 106 is mounted on the support 10 in the bottom of housing 11. The bottom of moveable carriage 27 is provided with a piston 107, which is adapted to enter the cylinder 106 as the carriage 27 drops to the bottom of housing 11, thereby bringing said carriage to a slow stop. The bottom of the cylinder 106 is provided with a small opening 108.

My preferred method of operating the camera is as follows: The valve 64 of by-pass 63 is opened. A liquid that has practically the same viscosity at all temperatures, such as glycerine, is added to the cylinder 61 until the cylinder 61 is filled.

Using sunlight, an apochromatic lens, and a Wratten and Wainwright panchromatic emulsion, I have found that it takes 18, 9 and 6 times as long to expose the plates taken through "C", "A", and "B" filters, respectively, as it does to expose plates without the use of a filter. The apertures 71, 85 and 90 are therefore set so that three times as much light passes through the aperture 71 as passes through the aperture 90, and so that fifty percent more light passes through the aperture 85 as passes through the aperture 90.

The aperture 71 is set by releasing the set-screws 79 and 82, and moving the elements 72 and 73 the same distance from the center, as indicated by the indicators and indicias. When the elements 72 and 73 have been moved the proper distance, the set-screws 79 and 82 are tightened. The apertures 85 and 90 are set in a similar manner. When the apertures 71, 85, and 90, are set, the part 67 of housing 11 is raised into position and held secure by means of locking nut 70, so that the housing 11 is again light-tight.

The valve 64 of by-pass 63 is then regulated by means of the indicator 65 and the dial 66 so that the carriage 27 will fall at the proper speed to give the correct exposures of the several plates for the settings of the apertures 71, 85, and 90.

The camera is then focused on the object to be photographed. This is accomplished as follows:

A piece of ground glass contained in a suitable holder is inserted in plate holder receiving opening 104. A suitable holder for the ground glass may be made by cutting the center out of a standard plate holder, and inserting a ground glass in said plate holder. The door 48 is pushed down to a horizontal position and is held there by engaging it with the catch 50. The camera is then focused on the subject by moving the housing 15 on the racks 14 by means of the thumb-screw 21. The catch 50 is then pushed back so that it no longer engages the door 48, which allows the door 48 to rotate on its spring hinge 49 back to its vertical position in front of plate holder receiving opening 104. The ground glass is removed, and standard plate holders 113, 114, and 115, are placed in standard plate holder receiving openings 103, 104, and 105. The slides of the plate holders nearest to the housing 11 are then pulled.

The rod 33 is depressed which frees the pawl 29 from engagement with the catch 28, and allows the carriage 27 to fall in the housing 11. As the piston 60 rises in the cylinder 61, it forces glycerine from above the piston through the by-pass 63 and the valve 64 back into the lower part of the cylinder 61.

By the time that the aperture 90 of section 37 drops to a position adjacent to the top of the bellows 102, the moveable carriage 27 will have accelerated to its maximum speed for the particular conditions involved. The moveable carriage 27 falls at a uniform rate of speed thereafter, until the top of section 35 passes below the support 13, when the piston 107 enters the cylinder 106.

As the carriage 27 falls, light passes through the aperture 90, through the "B" filter 46, and strikes the photographic plate in standard plate holder 114. As the moveable carriage 27 falls, the curtain 52 is unwound.

As the carriage 27 continues to fall, light passes through the aperture 85, is reflected to the left by reflector 42, passes through the "A" filter 44, and strikes the photographic plate in standard plate holder 115.

As the carriage 27 continues to fall, light passes through the aperture 71, is reflected to the right by reflector 39, passes through the "C" filter 41, and strikes the photographic plate in standard plate holder 113. The curtain 52 which is connected to the top of the moveable carriage 27, keeps the light from entering the housing 11 as the top of said moveable carriage 27 falls below the bottom of bar 101.

As the carriage 27 continues to fall, the piston 107 enters the cylinder 106, which compresses the air in said cylinder 106, and brings the carriage 27 to a gradual stop. The slides are then replaced in the standard plate holders, after which said standard plate holders may be withdrawn from the camera, and the plates developed.

The images made by the reflectors are laterally inverted, but this is easily compensated for by printing the positives from said laterally inverted negatives by projection in the well known manner.

If laterally correct images are desired, they may be produced by placing the photographic plates in the standard plate holders 113 and 115 with the glass toward the reflectors, rather than the emulsion side toward the reflectors. The resulting error in registration due to placing the plates in the plate holders in this manner, must be corrected for by placing the plate holder receiving openings 103 and 105 a corresponding distance closer to said reflectors.

In Figure 5 I show a modification by means of which the time of exposing each of the several plates may be varied. In other words, by means of this modification, the speed of the carriage may be reduced while the second exposure is made, and may be still further reduced while the third exposure is made, rather than have the carriage fall at a constant rate of speed as previously described.

In this modification, the cylinder 119 is made in four compartments, 120, 121, 122 and 123. A by-pass 124 provided with a valve 125, an indicator 126, and a dial 127. connects compartments 120 and 121. A by-pass 128 provided with a valve 129, an indicator 130, and a dial 131 connects compartments 121 and 122. A by-pass 132 provided with a valve 133, an indicator 134, and a dial 135 connects compartments 122 and 123. The top of the cylinder 119 is provided with a small opening 136, and the bottom of said cylinder with a small opening 137.

Compartment 120 is nearly filled with glycerine, or other suitable liquid, so that the liquid flows through the by-pass 124 to compartment 121 as light passes through the aperture 90. At this stage, the fall of the carriage 27 is regulated by the setting of the valve 125. As light passes through the aperture 85, the liquid flows through the by-pass 128 to compartment 122. At this stage, the fall of the carriage 27 is regulated by the setting of the valve 129, unless the passage through valve 125 is narrower than the passage through valve 129. As light passes through the aperture 71, the cylinder 119 is constructed so that the liquid flows through the by-pass 132 to compartment 123. At this stage, the fall of the carriage 27 is regulated by the setting of the valve 133, unless the passage through valve 125, or through valve 129, is narrower than the passage through valve 133.

Obviously using this modification the speed of the carriage 27 may be successively reduced, but cannot be increased. Under the conditions previously described, and with the color filters placed in the same holders, valves 125, 129, and 133 would be set so that it takes fifty percent longer for the aperture 85 to pass by the bellows 102 as it takes the aperture 90 to pass by said bellows, and so that it takes twice as long for the aperture 71 to pass by said bellows as it takes the aperture 85 to pass by said bellows. Under the above conditions, the aperture 71, 85, and 90, would be set at the same opening, which would be the setting required to correctly expose the several plates.

Obviously using this modification it may be desired to both successively increase the time of exposure, and to vary the openings of the apertures 71, 85, and 90.

Although I prefer to make the reflectors of stainless steel, they may be made of silver coated glass, or other suitable light reflecting material.

Although I prefer to mount the reflectors on the carriage at an angle of forty-five degrees, they may be mounted on the carriage at any angle from approximately twenty degrees to approximately seventy degrees, but the location of the photographic plates must be changed in accordance with the angle at which the reflectors are mounted on the carriage.

Although I have described my invention in connection with the production of color separation negatives, the method of using the camera of my invention to produce successive black and white photographs is evident from the foregoing description, and will not be described here.

Color separation negatives may be made with the above camera in a fraction of a second. This time, however, may be reduced considerably by using forces in addition to gravity to pull the moving carriage down.

Although I prefer to allow the moving carriage to fall down, in some cameras it may be preferred to force said moving carriage up, or to mount the reflectors on a carriage which moves horizontally. However, the movement of the reflectors should be at right angles to the axis of the lens.

Although I prefer to place the photographic plates fairly close to the sides of the housing 11, in some instances it may be preferable to position them a considerable distance from said housing. For example, in some cameras it may be preferable to position the photographic plates the same distance from the housing 11 that the lens 23 is from said housing.

Although I have shown a camera provided with two reflectors which is adapted to produce three color separation negatives, the camera may be constructed with one, two, three, four or more reflectors, depending upon the number of successive exposures desired.

Instead of having the reflectors mounted on a carriage which moves continuously, the movement of the reflectors may be intermittent. In other words, the reflectors may be stationary while the exposures are made.

Although I have shown the color filters mounted on the sides of the moveable carriage 27, they may be placed either in front of, or in the rear of, the lens holder 24, in front of, or in the rear of, the light aperture 71, 85, and 90, or in front of the plate holder receiving openings 103, 104 and 105.

Although I have described my invention with respect to certain particular embodiments thereof, nevertheless I do not desire to be limited to the particular details shown and described except as clearly specified in the appended claims, since many changes, modifications and substitutions may be made without departing from my invention in its broader aspects and my invention in its broader aspects is useful in many other applications thereof.

I claim as my invention:

1. A camera, which includes a casing, a lens, a plurality of light reflecting elements, and means for moving the reflecting elements in a direction at right angles to that of the axis of the lens across the axis of the lens to direct light rays to planes parallel to that of the axis of said lens.

2. A camera, which includes a casing, a lens, a plurality of light reflecting elements, and means for moving the reflecting elements in a direction at right angles to that of the axis of the lens at different periods across the axis of the lens to direct light rays to planes parallel to that of the axis of said lens.

3. A camera, which includes a casing, a lens, a plurality of light reflecting elements, means for moving the reflecting elements in a direction at right angles to that of the axis of the lens across the axis of the lens with an interval to direct light rays to planes parallel to that of the axis of said lens, and to expose a plane perpendicular to the axis of said lens by direct light rays from said lens.

4. A camera, which includes a casing, a lens, a plurality of light reflecting elements, means for moving the reflecting elements in a direction at right angles to that of the axis of the lens across the axis of the lens to direct light rays to planes parallel to that of the axis of said lens, and a plurality of light apertures adapted to control the passage of light to said light reflecting elements.

5. A camera which includes, a casing, a lens, a plurality of light reflecting elements mounted on a carriage, means for moving said carriage in a direction at right angles to that of the axis of the lens across the axis of said lens to direct light rays to planes parallel to that of the axis of said lens, and means for definitely controlling the speed of the moveable carriage.

6. A camera which includes, a casing, a lens, a plurality of light reflecting elements mounted on a carriage, means for moving said carriage in a direction at right angles to that of the axis of the lens across the axis of said lens to direct light rays to planes parallel to that of the axis of said lens, and means for moving the carriage at a constant rate of speed.

7. A camera which includes, a casing, a lens, a plurality of light reflecting elements mounted on a carriage, means for moving said carriage in a direction at right angles to that of the axis of the lens across the axis of said lens to direct light rays to planes parallel to that of the axis of said lens, and means for varying the speed of the carriage as the successive exposures are made.

8. A camera which includes, a casing, a lens, a plurality of light reflecting elements mounted on a carriage, means for moving said carriage in a direction at right angles to that of the axis of the lens across the axis of said lens to direct light rays to planes parallel to that of the axis of said lens, means for definitely controlling the speed of the moveable carriage, and a plurality of light apertures adapted to control the passage of light to said light reflecting elements.

9. A camera which includes, a casing, a lens, a plurality of light reflecting elements mounted on a carriage, means for moving said carriage in a direction at right angles to that of the axis of the lens across the axis of said lens to direct light rays, and means for definitely controlling the speed of the moveable carriage.

10. A camera, which includes a casing, a lens, a plurality of light reflecting elements, and means for moving the reflecting elements across the axis of the lens to direct light rays to planes parallel to the direction of the travel of the reflecting elements.

11. A camera, which includes a casing, a lens, a plurality of light reflecting elements, and means for moving the reflecting elements at different periods across the axis of the lens to direct light rays to planes parallel to the direction of the travel of the reflecting elements.

12. A camera, which includes a casing, a lens, a plurality of light reflecting elements, means for moving the reflecting elements across the axis of the lens with an interval to direct light rays to planes parallel to the direction of the travel of said reflecting elements, and to expose a plane perpendicular to the axis of said lens by direct light rays from said lens.

13. A camera, which includes a casing, a lens, a plurality of light reflecting elements, means for moving the reflecting elements across the axis of the lens to direct light rays to planes parallel to the direction of the travel of said light reflecting elements, and a plurality of light apertures adapted to control the passage of light to said light reflecting elements.

14. A camera which includes, a casing, a lens, a plurality of light reflecting elements mounted on a carriage, means for moving said carriage across the axis of said lens to direct light rays to planes parallel to the direction of the travel of said carriage, and means for moving the carriage at a constant rate of speed.

15. A camera which includes, a casing, a lens, a plurality of light reflecting elements mounted on a carriage, means for moving said carriage across the axis of said lens to direct light rays to planes parallel to the direction of the travel of said carriage, and means for definitely controlling the speed of the moveable carriage.

16. A camera which includes a casing, a lens, a plurality of light reflecting elements mounted on a carriage, means for moving said carriage across the axis of said lens to direct light rays to planes parallel to the direction of the travel of said carriage, and means for varying the speed of the carriage as the successive exposures are made.

17. A camera which includes a casing, a lens, a plurality of light reflecting elements mounted on a carriage, means for moving said carriage across the axis of said lens to direct light rays to planes parallel to the direction of the travel of said carriage, means for definitely controlling the speed of the moveable carriage, and a plurality of light apertures adapted to control the passage of light to said light reflecting elements.

18. A camera which includes, a casing, a lens, a plurality of light reflecting elements mounted on a carriage, means for moving said carriage across the axis of said lens to direct light rays, and means for definitely controlling the speed of the moveable carriage.

GERALD B. DEVIN.